United States Patent
Cho et al.

(10) Patent No.: US 10,116,791 B2
(45) Date of Patent: *Oct. 30, 2018

(54) METHODS AND APPARATUS FOR TRANSMITTING DATA

(71) Applicant: Samsung Electronics Co., Ltd., Gyeonggi-do (KR)

(72) Inventors: Hyung-rae Cho, Seoul (KR); Hyun-joo Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,223

(22) Filed: Jan. 7, 2016

(65) Prior Publication Data

US 2016/0119471 A1    Apr. 28, 2016

Related U.S. Application Data

(63) Continuation of application No. 13/324,374, filed on Dec. 13, 2011, now Pat. No. 9,247,046.

(30) Foreign Application Priority Data

Feb. 22, 2011    (KR) ........................ 10-2011-0015571

(51) Int. Cl.
*H04M 1/00*    (2006.01)
*H04B 1/38*    (2015.01)
(Continued)

(52) U.S. Cl.
CPC ... *H04M 3/42042* (2013.01); *H04M 3/42068* (2013.01); *H04W 4/21* (2018.02); *H04W 8/20* (2013.01); *H04M 2203/655* (2013.01)

(58) Field of Classification Search
CPC ......... H04W 4/00–4/003; H04W 4/16; H04W 4/18; H04W 4/185; H04W 4/206; H04W 8/18–8/24
(Continued)

(56) References Cited

U.S. PATENT DOCUMENTS 7,085,257 B1 *    8/2006    Karves ............. H04M 3/42093
                                                    370/352
7,280,646 B2 *   10/2007    Urban .................... H04L 47/10
                                                    379/142.01
(Continued)

FOREIGN PATENT DOCUMENTS

JP      2009-032166        2/2009
KR    1020020058618        7/2002
(Continued)

OTHER PUBLICATIONS

Australian Examination Report dated Aug. 25, 2016 issued in counterpart application No. 2015218550, 6 pages.

(Continued)

*Primary Examiner* — San Htun (74) *Attorney, Agent, or Firm* — The Farrell Law Firm, P.C.

(57) ABSTRACT

A methods and apparatus for transmitting data are provided. The method includes receiving a call signal to be transmitted to a receiver including sender and receiver information associated with the call signal from a sender; confirming a relationship between the sender and the receiver that exists in at least one server; requesting sender data associated with the sender from the at least one server to which the sender is subscribed based on the relationship between the sender and the receiver to the at least one server; receiving the requested sender data from the at least one server; and transmitting the received sender data to the receiver.

11 Claims, 5 Drawing Sheets

(51) Int. Cl.
*H04M 3/42* (2006.01)
*H04W 8/20* (2009.01)
*H04W 4/21* (2018.01)

(58) Field of Classification Search
USPC ........ 455/415; 370/352; 379/142.01, 142.04, 379/142.06, 88.19
See application file for complete search history.

(56) References Cited

U.S. PATENT DOCUMENTS

| | | | | |
|---|---|---|---|---|
| 7,839,987 | B1* | 11/2010 | Kirchhoff | H04M 3/42195 379/142.01 |
| 8,977,242 | B1* | 3/2015 | Brown | H04W 4/16 455/412.1 |
| 9,264,867 | B1* | 2/2016 | Kotab | H04M 1/57 |
| 2002/0176379 | A1* | 11/2002 | Wallenius | H04W 4/20 370/328 |
| 2005/0084084 | A1* | 4/2005 | Cook | H04M 1/576 379/142.01 |
| 2005/0232247 | A1 | 10/2005 | Whitley et al. | |
| 2006/0026298 | A1 | 2/2006 | Zeng et al. | |
| 2007/0127656 | A1* | 6/2007 | Citron | H04M 1/56 379/142.01 |
| 2008/0152097 | A1* | 6/2008 | Kent | H04L 12/66 379/93.01 |
| 2009/0005023 | A1 | 1/2009 | Toom | |
| 2009/0086720 | A1* | 4/2009 | Westlake | H04L 12/66 370/352 |
| 2009/0177484 | A1 | 7/2009 | Davis et al. | |
| 2009/0197681 | A1 | 8/2009 | Krishnamoorthy et al. | |
| 2009/0310768 | A1* | 12/2009 | Hansen | H04M 3/436 379/201.02 |
| 2010/0015976 | A1* | 1/2010 | Issa | G06F 17/30699 455/435.1 |
| 2010/0027778 | A1 | 2/2010 | Kumar et al. | |
| 2010/0287281 | A1 | 11/2010 | Tirpak | |
| 2010/0293247 | A1 | 11/2010 | McKee et al. | |
| 2011/0009103 | A1* | 1/2011 | Do | G06F 3/0482 455/414.3 |
| 2011/0022388 | A1* | 1/2011 | Wu | G10L 17/22 704/246 |
| 2011/0038469 | A1 | 2/2011 | Clark et al. | |
| 2011/0129077 | A1* | 6/2011 | Prakash | H04L 12/588 379/142.04 |
| 2011/0182414 | A1* | 7/2011 | Hemant | H04M 1/575 379/142.06 |
| 2011/0274260 | A1* | 11/2011 | Vaananen | G06F 17/30864 379/93.23 |
| 2012/0196581 | A1* | 8/2012 | Papakipos | H04L 51/046 455/415 |
| 2012/0219128 | A1 | 8/2012 | Farah et al. | |
| 2016/0119471 | A1 | 4/2016 | Cho et al. | |

FOREIGN PATENT DOCUMENTS

| | | |
|---|---|---|
| KR | 1020030034720 | 5/2003 |
| KR | 1020040067134 | 7/2004 |
| KR | 1020090022836 | 3/2009 |
| KR | 1020100137659 | 12/2010 |
| KR | 1020120096264 | 8/2012 |

OTHER PUBLICATIONS

Korean Office Action dated Feb. 20, 2017 issued in counterpart application No. 10-2011-0015571, 14 pages.
European Search Report dated Feb. 23, 2017 issued in counterpart application No. 11859642.8-1875, 8 pages.
Korean Office Action dated Aug. 29, 2017 issued in counterpart application No. 10-2011-0015571, 11 pages.
Korean Office Action dated Nov. 29, 2017 issued in counterpart application No. 10-2011-0015571, 4 pages.
Korean Office Action dated May 8, 2018 issued in counterpart application No. 10-2018-0024724, 8 pages.

* cited by examiner

METHODS AND APPARATUS FOR TRANSMITTING DATA

PRIORITY

This application is a Continuation Application of U.S. application Ser. No. 13/324,374, which was filed in the U.S. Patent and Trademark Office on Dec. 13, 2011 and claims priority under 35 U.S.C. § 119(a) to Korean Patent Application No. 10-2011-0015571, filed on Feb. 22, 2011, in the Korean Intellectual Property Office, the disclosure of which is incorporated herein by reference.

BACKGROUND OF THE INVENTION

1. Field of the Invention

The present invention relates generally to a method and an apparatus for transmitting data, and more particularly, to a method and an apparatus for transmitting data to a receiver by extracting sender data from a predetermined server when the sender makes a phone call.

2. Description of the Related Art

In current mobile phones, an image of a sender of an incoming call can be displayed on a screen of the mobile phone when there is an incoming call. The image of the sender is displayed on a screen of the receiver's mobile phone when the information of the sender coincides with information and an image of the sender stored in the receiver's mobile phone. If the image of the sender is not stored in the receiver's mobile phone, it is not possible to display the image of the sender.

SUMMARY OF THE INVENTION

The present invention has been made to address at least the above problems and/or disadvantages and to provide at least the advantages described below. Accordingly, an aspect the present invention provides a method and apparatus for transmitting data to a receiver by extracting data associated with a sender from a server when the sender makes a phone call to the receiver.

According to one aspect of the present invention, a method of transmitting data is provided. The method includes receiving a call signal to be transmitted to a receiver including sender and receiver information associated with the call signal from a sender; confirming a relationship between the sender and the receiver that exists in at least one server; requesting sender data associated with the sender from the at least one server to which the sender is subscribed based on the relationship between the sender and the receiver to the at least one server; receiving the requested sender data from the at least one server; and transmitting the received sender data to the receiver.

According to another aspect of the present invention, an apparatus for transmitting data is provided. The apparatus includes a control unit that receives a call signal to be transmitted to a receiver including sender information and receiver information associated with the call signal from a sender, confirms a relationship between the sender and the receiver, that exists in at least one server, requests sender data associated with the sender from the at least one server to which the sender is subscribed based on the relationship between the sender and the receiver to the at least one server, and receives the requested sender data from the at least one server; and a transmission unit that transmits the received sender data to the receiver.

According to another aspect of the present invention, a non-transitory computer readable recording medium having recorded thereon a program for executing a method is provided. The method includes receiving a call signal to be transmitted to a receiver including sender and receiver information associated with the call signal from a sender; confirming a relationship between the sender and the receiver that exists in at least one server; requesting sender data associated with the sender from the at least one server to which the sender is subscribed based on the relationship between the sender and the receiver to the at least one server; receiving the requested sender data from the at least one server; and transmitting the received sender data to the receiver.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1:
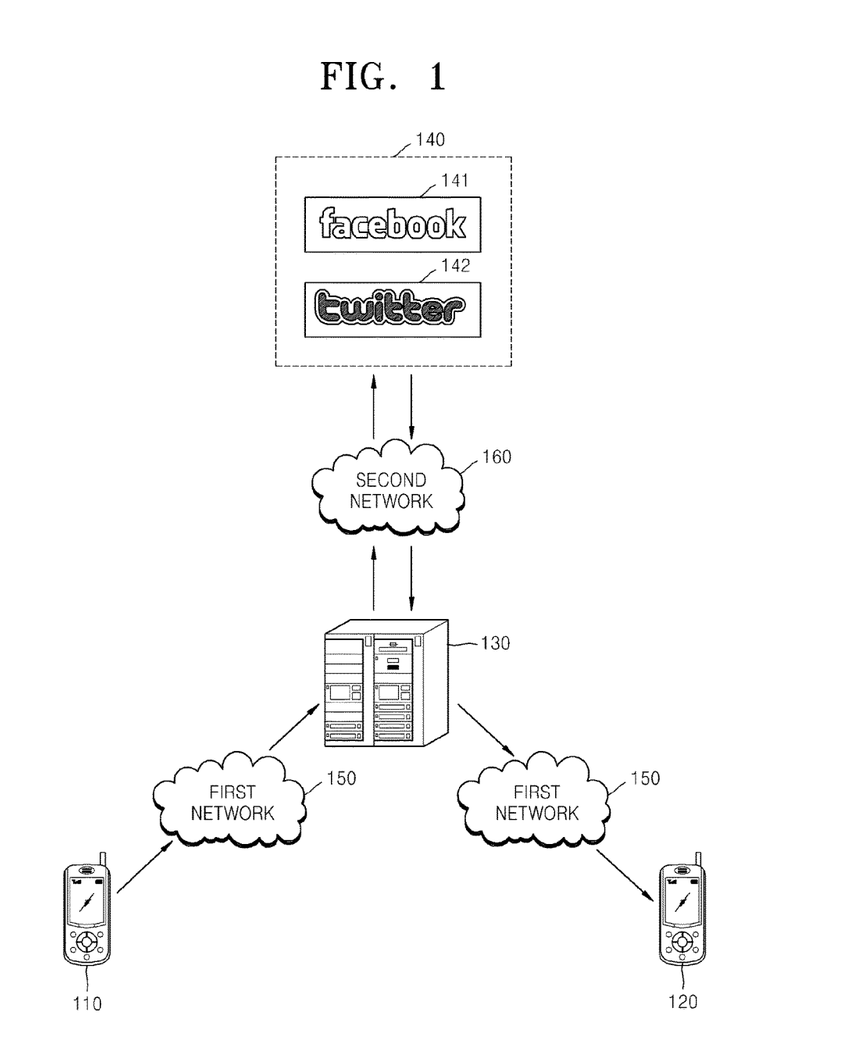
FIG. 1 is a schematic diagram illustrating a data transmission system, according to an embodiment of the present invention.

FIG. 1 is a schematic diagram illustrating a data transmission system, according to an embodiment of the present invention.

Referring to FIG. 1, the data transmission system includes a sender mobile device 110, a receiver mobile device 120, an apparatus 130 for transmitting data, and a network service server 140. The sender mobile device 110 and the receiver mobile device 120 are connected to the apparatus 130 through a first network 150. The apparatus 130 and the network service server 140 are connected via a second network 160.

The first network 150 is a network through which a phone call can be made, and the second network 160 is not specifically limited as long as it supports data transmission. The first network 150 and the second network 160 may or may not be the same.

The network service server 140 may be a Social Network Service (SNS) server, but is not limited thereto. Specifically, the network service server 140 may be any server that stores data relating to users of that network service.

A sender transmits a call signal, sender information (for example, sender identification), and receiver information (for example, receiver identification) through the first network 150 using the sender mobile device 110. The apparatus 130 that receives the call signal searches for sender data and receiver data based on the sender information and the receiver information. For example, the apparatus 130 may select sender data that is stored in the apparatus 130. The apparatus may also request and select sender data from the network service server 140. The apparatus 130 then transmits the selected sender data to the receiver mobile device 120 together with the call signal.

Figure 2:
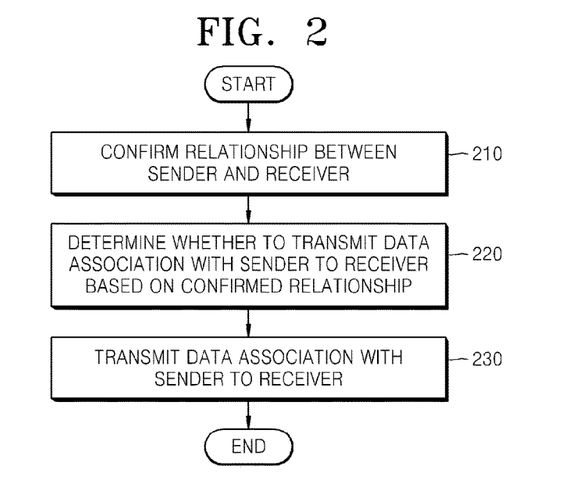
FIG. 2 is a flowchart illustrating a method of data transmission, according to an embodiment of the present invention.

FIG. 2 is a flowchart illustrating a method of data transmission, according to an embodiment of the present invention.

Referring to FIG. 2, in step 210, the apparatus 130 confirms link information of, or a relationship between, the sender and the receiver. The call signal, the sender information, and the receiver information are received from the sender mobile device 110 according to this embodiment of the present invention. A "call" denotes occupation of a communication line by subscribers for the purpose of communication. The sender information and the receiver information may be phone numbers of the sender and the receiver. The apparatus 130 confirms link information of the sender and the receiver based on the received information of the sender and the receiver. The link information denotes a relationship between the sender and the receiver (for example, both the sender and the receiver are registered in a user group stored in the apparatus 130). In an embodiment of the present invention, the relationship between the sender and the receiver may enable the sender and the receiver to mutually read text or share data registered in their accounts by request and approval by both parties in a network service server (for example, an SNS server). For example, the relationship between the sender and the receiver may denote a 'friend' relationship in Facebook®, or a following or follower relationship in Twitter®, both of which are types of SNS servers. The apparatus 130 may confirm the link information of the users based on data stored in the apparatus 130 or in a predetermined network service server.

In step 220, the apparatus 130 determines whether to transmit the data associated with the sender to the receiver based on the confirmed information. The apparatus 130 selects data associated with the sender based on the confirmed information. Specifically, the apparatus 130 may select different data according to the confirmed relationship. Data may include a photo or a motion picture, but is not limited thereto. Data associated with the sender denotes data transmitted by the sender or data stored in a data transmission device or an external server, but is not limited thereto. The apparatus 130 may select sender data stored in the apparatus 130. Also, the apparatus 130 may request and receive sender data from an external network service server associated with the sender or the sender and the receiver. The apparatus 130 may also select data that was transmitted by the sender. The sender may transmit data and predetermined address information (for example, a Uniform Resource Locator (URL)) where data is stored. In this embodiment of the present invention, the apparatus 130 may request data from an external network service server 140 based on the address information, and then may select the data received in response to the request. The network service server 140 denotes an SNS server, but is not limited thereto. Specifically, the external network service server 140 may be any service server in which data associated with the sender, or both the sender and the receiver, are stored.

In step 230, the apparatus 130 transmits data associated with the sender to the receiver. For example, the apparatus 130 transmits the selected data associated with the sender and a call signal to the receiver mobile device 120 based in accordance with the receiver information. The receiver mobile device 120 may be driven by the data received together with the call signal.

Figure 3:
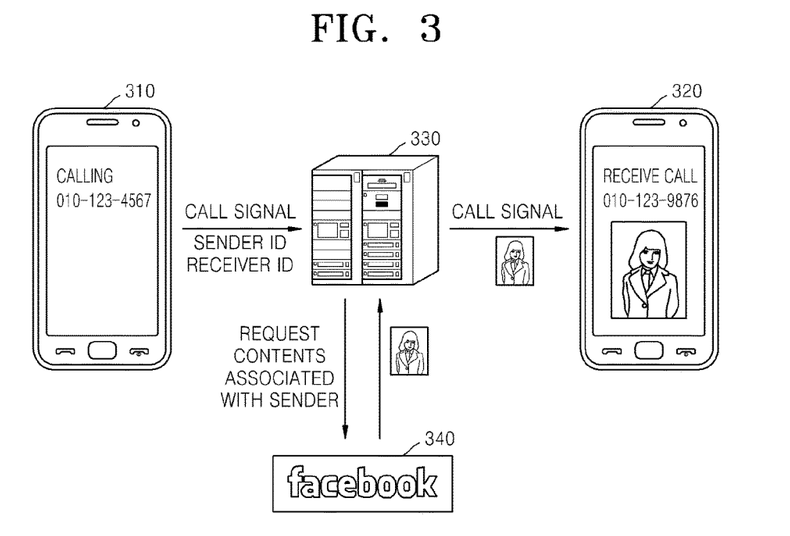
FIG. 3 is a schematic diagram illustrating a scenario of the method of data transmission of FIG. 2, according to an embodiment of the present invention.

FIG. 3 is a schematic diagram illustrating a scenario of the method of data transmission of FIG. 2, according to an embodiment of the present invention.

Referring to FIG. 3, when a sender makes a phone call by using a sender mobile device 310, the sender mobile device 310 transmits a call signal, a phone number (010-123-4567) of a sender, and a phone number (010-123-9876) of a receiver to a cloud server 330. When the cloud server 330 receives the call signal, it searches for sender data based on the sender's phone number or the receiver's phone number. In an embodiment of the present invention, the cloud server 330 selects the sender data and transmits the call signal and the sender data to a receiver mobile device 320. In another embodiment of the present invention, the cloud server 330 requests the sender data from an SNS server 340, and transmits the sender data to the receiver mobile device 320 together with the call signal. Also, in another embodiment of the present invention, the cloud server 330 transmits the sender's data to the receiver mobile device 320 together with the call signal after receiving the sender's data from the sender mobile device 310. The sender data may be displayed on the receiver mobile device 320.

Figure 4:
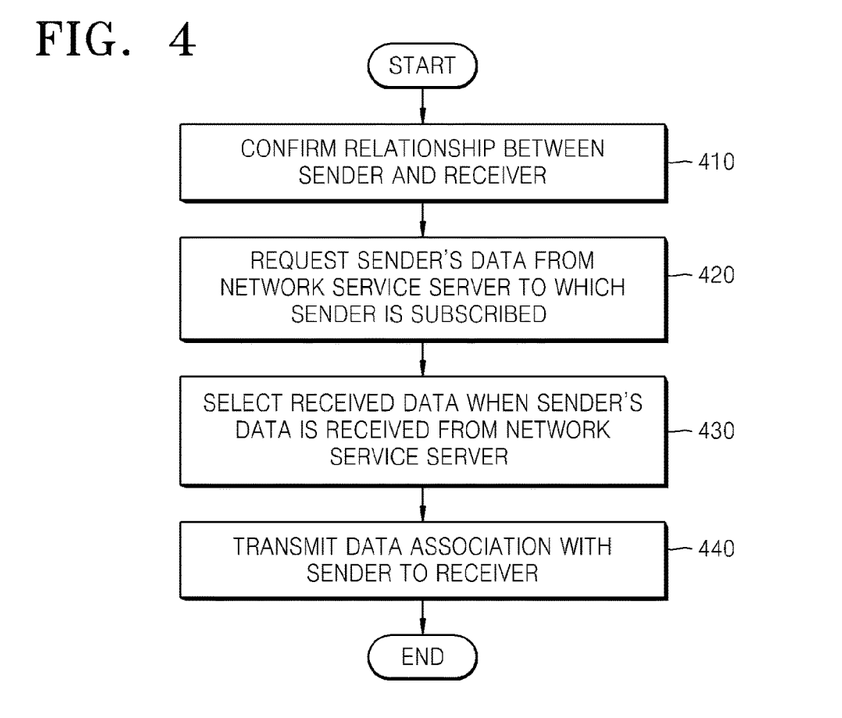
FIG. 4 is a flowchart illustrating a method of data transmission, according to another embodiment of the present invention.

FIG. 4 is a flowchart illustrating a method of data transmission, according to another embodiment of the present invention. Specifically, FIG. 4 illustrates a detailed flow of operations with respect to the selection of data associated with the sender based on the received information of FIG. 2.

Referring to FIG. 4, steps 410 and 440 are the same as steps 210 and 230 of FIG. 2.

In step 420, the apparatus 130 requests sender data from the network service server 140 where the sender is registered based on the link information of the sender and the receiver. In an embodiment of the present invention, the network service server 140 may be an SNS server. The apparatus 130 searches for at least one SNS server in which the sender is registered by using the sender information. Information about the user's subscription in the SNS server may be stored in the apparatus 130 in advance. In another embodiment of the present invention, without having to confirm the subscription of the sender in the SNS server, data associated with the sender may be requested by transmitting the sender information to all SNS servers registered in the apparatus 130. The apparatus 130 may also request the most recently uploaded sender data from at least one selected SNS server.

In another embodiment of the present invention, the apparatus 130 may determine at least one SNS server that is associated with the sender and the receiver based on the sender information and the receiver information, and then, may send a request for the sender data to the determined SNS server. The apparatus 130 may request the most recently uploaded sender data from the at least one determined SNS server.

In step 430, when the apparatus 130 receives the sender data from the network service server, which the apparatus 130 requested, the apparatus 130 selects the received data. If the apparatus 130 receives a plurality of sender data, the apparatus 130 selects the most recently uploaded data.

After step 430, the apparatus 130 may store the received sender data in an account of the sender. Also, the apparatus 130 may request receiver data from the determined SNS server. When the apparatus 130 receives the receiver data, the receiver data may be stored in an account of the receiver.

Figure 5:
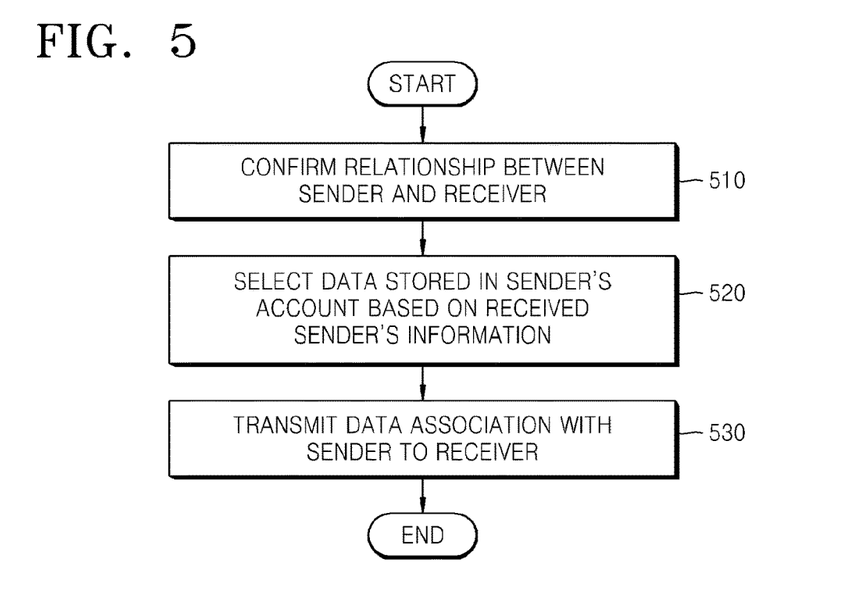
FIG. 5 is a flowchart illustrating a method of data transmission, according to another embodiment of the present invention.

FIG. 5 is a flowchart illustrating a method of data transmission, according to another embodiment of the present invention. Specifically, FIG. 5 illustrates a detailed flow of operations with respect to the selection of data associated with the sender based on the received information of FIG. 2.

Referring to FIG. 5, steps 510 and 530 are the same as steps 210 and 230 of FIG. 2.

In step 520, the apparatus 130 selects data stored in an account of the sender based on the received sender information. If there is a plurality of data stored in the sender's account, the apparatus 130 selects the most recently stored data.

In another embodiment of the present invention, if there is no data stored in the sender's account, the apparatus 130 may perform the operations of 420 and 430 of FIG. 4.

Figure 6:
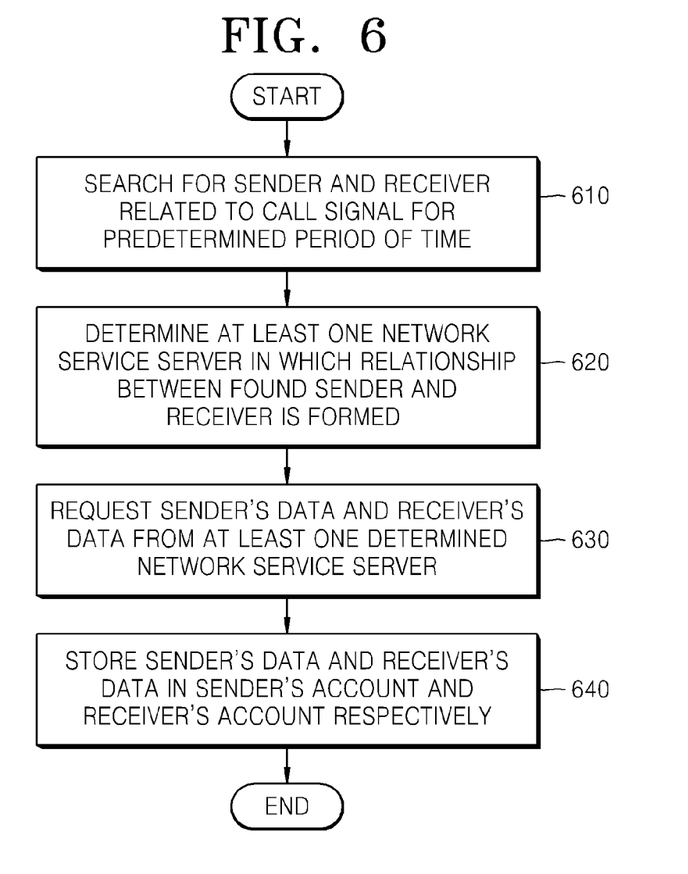
FIG. 6 is a flowchart illustrating a method of updating data stored in an apparatus for transmitting data, according to an embodiment of the present invention.

FIG. 6 is a flowchart illustrating a method of updating data stored in an apparatus, according to an embodiment of the present invention.

Referring to FIG. 6, in step 610, the apparatus 130 searches for senders and receivers who are related to a call signals received in a predetermined period. For example, the apparatus 130 researches senders and receivers related to call signals received from the last 6 months. The apparatus 130 may filter found senders and receivers. For example, the apparatus 130 may search for the senders and receivers in an order of call frequency.

In step 620, the apparatus 130 determines at least one network service server that has a relationship with the found senders and receivers. The relationship between the sender and the receiver indicates that they can mutually read text or share data registered in their accounts by request and approval by both parties in an SNS server.

In step 630, the apparatus 130 requests sender data and receiver data from the determined network service server. The apparatus 130 may request the most recently uploaded sender data and receiver data from the network service server.

In step 640, if the apparatus 130 receives data in response to the request, the data is respectively stored in each of the sender's account and the receiver's account.

Figure 7:
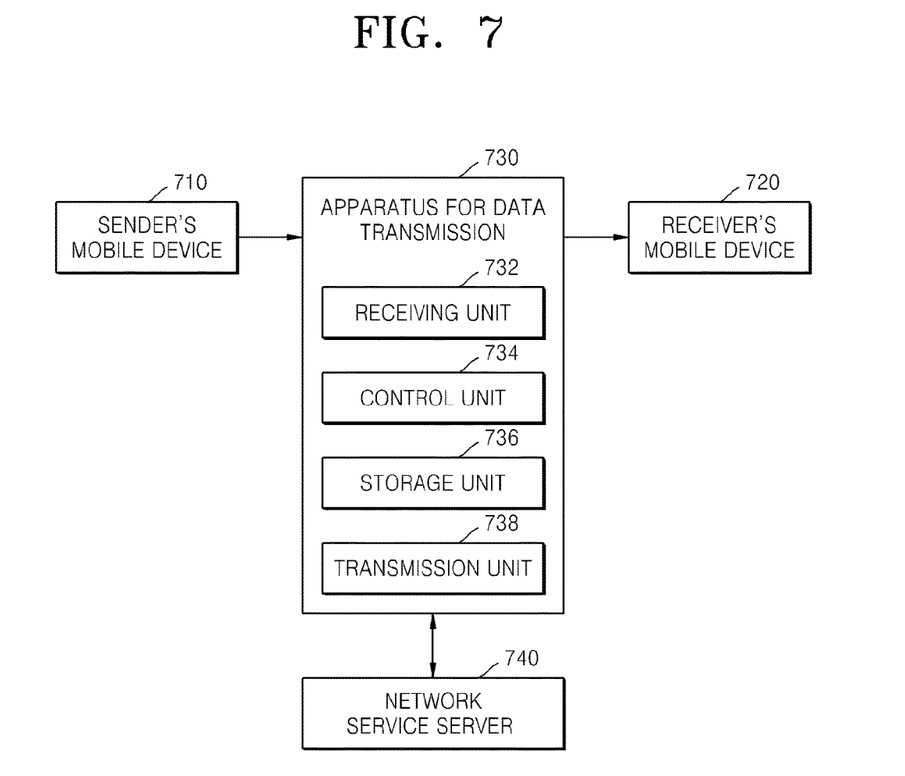
FIG. 7 is a block diagram illustrating an apparatus for transmitting data, according to an embodiment of the present invention.

FIG. 7 is a block diagram illustrating an apparatus, according to an embodiment of the present invention.

Referring to FIG. 7, an apparatus 730 includes a receiving unit 732, a control unit 734, a storage unit 736, and a transmission unit 738. The apparatus 730 is connected to a sender mobile device 710, a receiver mobile device 720, and a network service server 740 through one or more predetermined networks.

The receiving unit 732 receives sender information and receiver information, for example, a call signal, sender identification, and receiver identification from the sender mobile device 710. A "call" denotes occupation of a communication line by subscribers for the purpose of communication. The sender information and the receiver information may be phone numbers of the sender and the receiver.

The control unit 734 confirms the relationship between the sender and the receiver based on the received sender information and receiver information. The relationship denotes a link between the sender and the receiver. For example, both the sender and the receiver may be registered in a user group stored in the storage unit 736. In an embodiment of the present invention, the relationship between the sender and the receiver indicates that they can mutually read text registered in their accounts or share data by request and approval by both parties in a network service server 740. For example, the relationship between the sender and the receiver denotes a 'friend' relationship in Facebook®, or a following or follower relationship in Twitter®. The control unit 734 may confirm the relationship between the sender and the receiver based on the data stored in the apparatus 730 or in the network service server 740.

The control unit 734 determines whether to transmit the data associated with the sender to the receiver based on the confirmed relationship. The control unit 734 selects data associated with the sender based on the confirmed relationship. The data may include a photograph or a motion picture, but is not limited thereto. The data associated with the sender denotes data transmitted by the sender or data stored in the storage unit 736 or the network service server 740, but is not limited thereto. The control unit 734 may select sender data stored in the storage unit 736. Also, the control unit 734 may select data associated with the sender by requesting and receiving the data from the network service server 740 associated with the sender or both the sender and the receiver. Also, the control unit 734 may select data transmitted by the sender mobile device 710. The sender mobile device 710 may transmit both data and predetermined address information (for example, a URL) in which the data is stored. The control unit 734 may request data associated with the sender based on the address information in which the data associated with the sender is stored, and then, may select the received data. In an embodiment of the present invention, the network service server 740 denotes an SNS server, but is not limited thereto. Specifically, the network service server 740 may be any service in which data associated with the sender, or both the sender and the receiver, is stored.

The transmission unit 738 may transmit the data associated with the sender to the receiver mobile device 720. For example, the transmission unit 738 transmits the selected data associated with the sender and a call signal to the receiver mobile device 720 based on the receiver information. The receiver mobile device 720 may regenerate or display data received together with the call signal.

The control unit 734 requests the sender data from the network service server 740 to which the sender is subscribed based on the relationship of the sender and the receiver. The network service server may be an SNS server. The control unit 734 searches and determines at least one network service server to which the sender is subscribed using the sender information. The information of the sender's network service server subscription may be stored in the storage unit 736 in advance. In another embodiment of the present invention, without having to confirm the subscription of the sender in the network service server, data associated with the sender may be requested by transmitting the sender information to all network service servers 740 registered in the storage unit 736. The control unit 734 may also request the most recently uploaded sender data from at least one determined SNS server.

In another embodiment of the present invention, the control unit 734 determines at least one network service server that is associated with the sender and the receiver based on the received sender information and receiver information. The control unit 734 then requests the sender data from the determined network service server 740. The control unit 734 may request the most recently uploaded sender data from the at least one determined network service server 740.

When the control unit 734 receives sender data from the network service server 740, which the control unit 734 requested, the control unit 734 may select the received data. If the control unit 734 receives a plurality of sender data, the apparatus 730 may select the most recently uploaded data.

The control unit 734 may store the received sender data in the sender's account of the storage unit 736. Also, the control unit 734 may request the receiver data from the network service server 740. When the control unit 734 receives the receiver data, the control unit 734 may store the receiver data in a receiver's account of the storage unit 736.

The control unit 734 may select data stored in the sender's account of the control unit 734 based on the received sender information. When there is a plurality of sender data stored in the sender's account, the control unit 734 may select the most recently stored data.

In another embodiment of the present invention, if there is no stored sender data in the sender's account of the storage unit 736, the control unit 734 may perform the method of selecting the sender data according to an embodiment of the present invention.

The storage unit 736 stores sender information and receiver information associated with a received call signal.

The control unit 734 searches for senders and receivers associated with call signals received for a predetermined period of time. For example, the control unit 734 searches for senders and receivers associated with call signals from the previous 6 months. The control unit 734 may filter the found senders and receivers. For example, the control unit 734 may search for the senders and receivers in an order of call frequency.

The control unit 734 determines at least one network service server associated with the found sender and receiver. The relationship between the sender and the receiver indicates that they can mutually read text or share data registered in their accounts by request and approval by both parties in an SNS server.

The control unit 734 requests sender data and receiver data from the determined network service server 740. The control unit 734 may request the most recently uploaded data of the sender and receiver from the network service server 740.

When the receiving unit 732 receives the data, the control unit 734 stores the sender data and the receiver data respectively into the sender's account and the receiver's account in the storage unit 736.

Software components including instructions or code for performing the methodologies described herein may be stored in one or more of the associated memory devices (e.g., Read Only Memory (ROM), fixed or removable memory) and, when ready to be utilized, loaded in part or in whole (e.g., into Random Access Memory (RAM)) and executed by a Central Processing Unit (CPU).

While the invention has been shown and described with reference to certain embodiments thereof, it will be understood by those of ordinary skill in the art that various changes in form and detail may be made therein without departing from the spirit and scope of the invention as defined by the appended claims.

What is claimed is:

1. A method of transmitting data performed by an apparatus, the method comprising:

receiving a request for a call signal, from a sender device to a receiver device, including sender information and receiver information associated with the call signal, from the sender device;

confirming a relationship between the sender and the receiver that exists in at least one external server, based on the received sender information and the receiver information;

requesting content associated with the sender which is uploaded on the at least one external server to which the sender is subscribed based on the relationship between the sender and the receiver, to the at least one external server;

receiving the requested content from the at least one external server; and transmitting the call signal together with the received content, to the receiver device, wherein the content is displayed on the receiver device while the call signal is being output on the receiver device, and wherein the sender and the receiver are filtered based on an order of call frequency.

2. The method of claim 1, further comprising:

storing the received content in an account of the sender in the apparatus.

3. The method of claim 2, further comprising:

requesting receiver data associated with the receiver to the at least one external server;

receiving the requested receiver data from the at least one external server; and storing the receiver data in an account of the receiver in the apparatus.

4. The method of claim 1, wherein the received content is transmitted to the receiver device together with the call signal received from the sender device.

5. The method of claim 1, wherein the sender and the receiver are associated with call signals received during a predetermined period of time.

6. An apparatus for transmitting data, the apparatus comprising:

a communication interface; and a controller configured to:

control to receive, via the communication interface, a request for a call signal, from a sender device to a receiver device, including sender information and receiver information associated with the call signal, from the sender device;

confirm a relationship between the sender and the receiver, that exists in at least one external server, based on the received sender information and the receiver information;

control to request content associated with the sender which is uploaded on the at least one external server to which the sender is subscribed based on the relationship between the sender and the receiver, to the at least one external server;

control to receive, via the communication interface, the requested content from the at least one external server; and control to transmit, via the communication interface, the call signal together with the received content, to the receiver device, wherein the content is displayed on the receiver device while the call signal is being output on the receiver device, and wherein the sender and the receiver are filtered based on an order of call frequency.

7. The apparatus of claim 6, wherein the controller is further configured to control to transmit, via the communication interface, the received content to the receiver device together with the call signal received from the sender device.

8. The apparatus of claim 6, wherein the controller is further configured to store the received content in an account of the sender in the apparatus.

9. The apparatus of claim 6, wherein the controller is further configured to:
   control to request receiver data associated with the receiver to the at least one external server;
   control to receive, via the communication interface, the requested receiver data from the at least one external server; and
   store the receiver data in an account of the receiver in the apparatus.

10. The apparatus of claim 6, wherein the sender and the receiver are associated with call signals received during a predetermined period of time.

11. A non-transitory computer readable recording medium having recorded thereon a program for executing a method comprising:

receiving a request for a call signal, from a sender device to a receiver device, including sender information and receiver information associated with the call signal, from the sender device;

confirming a relationship between the sender and the receiver that exists in at least one external server, based on the received sender information and the receiver information;

requesting content associated with the sender which is uploaded on the at least one external server to which the sender is subscribed based on the relationship between the sender and the receiver, to the at least one external server;

receiving the requested content from the at least one external server; and transmitting the call signal together with the received content, to the receiver device, wherein the content is displayed on the receiver device while the call signal is being output on the receiver device, and wherein the sender and the receiver are filtered based on an order of call frequency.

\* \* \* \* \*